(12) United States Patent
Bothner et al.

(10) Patent No.: US 8,432,565 B2
(45) Date of Patent: Apr. 30, 2013

(54) JOB DISTRIBUTION AMONG NETWORKED RESOURCES IN A DOCUMENT PROCESSING ENVIRONMENT

(75) Inventors: Carl R. Bothner, Rochester, NY (US); Bruce Edward Talbert, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1323 days.

(21) Appl. No.: 11/776,349

(22) Filed: Jul. 11, 2007

(65) Prior Publication Data

US 2009/0015859 A1 Jan. 15, 2009

(51) Int. Cl.
*G06F 3/12* (2006.01)
*G06F 15/177* (2006.01)
*G06F 3/00* (2006.01)

(52) U.S. Cl.
USPC .......................... 358/1.15; 715/735; 715/738

(58) Field of Classification Search .................. None
See application file for complete search history.

(56) References Cited

U.S. PATENT DOCUMENTS

| | | | |
|---|---|---|---|
| 5,287,194 A * | 2/1994 | Lobiondo | 358/296 |
| 6,070,000 A * | 5/2000 | Mori | 358/1.15 |
| 6,470,339 B1 | 10/2002 | Karp et al. | |
| 6,583,888 B1 * | 6/2003 | Salgado et al. | 358/1.15 |
| 6,751,732 B2 | 6/2004 | Strobel et al. | |
| 6,779,182 B1 | 8/2004 | Zolnowsky | |
| 6,922,725 B2 | 7/2005 | Lamming et al. | |
| 7,043,007 B2 | 5/2006 | McPartlan et al. | |
| 7,171,476 B2 | 1/2007 | Maeda et al. | |
| 7,180,614 B1 * | 2/2007 | Senoo et al. | 358/1.15 |
| 7,861,172 B1 * | 12/2010 | Minagawa | 715/735 |
| 2001/0034812 A1 * | 10/2001 | Ignatius et al. | 711/112 |
| 2004/0073684 A1 * | 4/2004 | Jodra et al. | 709/228 |
| 2005/0174609 A1 | 8/2005 | Thurlow | |
| 2005/0243369 A1 * | 11/2005 | Goldstein et al. | 358/1.18 |
| 2006/0227363 A1 * | 10/2006 | Ogura | 358/1.15 |
| 2007/0162480 A1 * | 7/2007 | Garg et al. | 707/101 |

* cited by examiner

*Primary Examiner* — Vincent Rudolph
(74) *Attorney, Agent, or Firm* — Fox Rothschild LLP

(57) ABSTRACT

A method of assigning a job in a document processing environment may include receiving, by a first resource, an identifier and a job. The first resource may be in communication with a plurality of second resources in a document processing environment. The identifier may correspond to a profile corresponding to one or more users. The job may have a job type. A customized interface may be displayed on the resource. The customized interface may present one or more options based on the job type and the profile. A selected value may be received for the one or more options. The profile may be updated with the one or more selected values. The job may be performed using the one or more selected values.

13 Claims, 6 Drawing Sheets

| No. | Identifier | Job | Single/Double Sided | Black/Color Ink | Staple? | Phone Number |
|---|---|---|---|---|---|---|
| 1 | 345 | Print | Single | Color | Yes | |
| 2 | 345 | Fax | | | | 800-234-5432 |
| 3 | 345 | Print | Double | Black | Yes | |
| 4 | 345 | Print | Double | Black | Yes | |
| 5 | 345 | Print | Single | Color | No | |
| 6 | 345 | Fax | | | | 323-234-2578 |
| 7 | 345 | Fax | | | | 800-234-5432 |
| 8 | 345 | Print | Double | Black | Yes | |
| 9 | 345 | Print | Double | Black | No | |
| 10 | 345 | Fax | | | | 434-867-9876 |
| 11 | 345 | Print | Double | Color | No | |
| 12 | 345 | Print | Double | Black | No | |
| 13 | 345 | Fax | | | | 800-234-5432 |
| 14 | 345 | Print | Double | Black | Yes | |
| 15 | 345 | Fax | | | | 800-234-5432 |
| 16 | 345 | Fax | | | | 434-867-9876 |
| 17 | 345 | Print | Double | Black | No | |

*FIG. 4*

JOB DISTRIBUTION AMONG NETWORKED RESOURCES IN A DOCUMENT PROCESSING ENVIRONMENT

BACKGROUND

Document processing environments typically have a variety of resources capable of receiving and performing jobs. A resource is a device capable of performing one or more specific types of jobs. Each resource in a document processing environment generally functions as an isolated unit. A user often must choose a particular resource to perform a job. Typically, if a user wants to send a print job to a printer resource from a computing device, the user must access an interface on the computing device that allows the user to select a printer. A different interface appears if the user wants to send a fax. After the user selects a job to be performed, the particular resource to perform the job may be selected in the interface based on the last use or a default value. Problems arise as a user must know the functionality of a resource in order to assign a job to that resource. Therefore, a user must communicate, either directly or indirectly, with a specific resource to accomplish a particular type of job.

Additionally, after a resource is chosen by a user, the resource typically displays a default user interface containing one or more predetermined values for one or more settings. As such, a user typically has to assign settings for the resource each time the resource is used. For example, in a printer interface, default values are provided for items such as the properties, page range, copies and zoom. Therefore, if the user wants to print two copies every time a print job is requested, the user will have to override the default value and select two copies each time.

SUMMARY

In one embodiment, a method of assigning a job in a document processing environment may include receiving, by a first resource, an identifier and a job. The first resource may be in communication with a plurality of second resources in a document processing environment. The identifier may correspond to a profile associated with a user. The job may have a job type. A customized interface may be displayed on the first resource. The customized interface may present one or more options based on the job type and the profile. The profile may be based on historical usage of the user. Each option may be associated with a plurality of values. One of the values for each option may have an assigned value. A selected value from the plurality of values may be received. At least one selected value may be received. The assigned value for at least one option may change based on the selected value and the profile. The profile may be updated with the one or more selected values. The job may be performed using the one or more selected values.

In one embodiment, whether the first resource is capable of performing the job using the one or more selected values may be determined. If the first resource is not capable of performing the job using the one or more selected values, the job and the one or more selected values may be transmitted to a second resource. In an alternate embodiment, if the first resource is capable of performing the one or more selected values, the job may be performed on the first resource using the one or more selected values. In one embodiment, determining whether the first resource is capable of performing the job using the one or more selected values may include determining if the first resource has functionality associated with the job and the one or more selected values. The job and the one or more selected values may be transmitted to a second resource based on information from a directory. In one embodiment, a periodic pulse may be generated by the first resource to determine if a second resource is located in the document processing environment. A second resource may be added to the document processing environment by registering the second resource in a directory.

In one embodiment, the first resource may include a printing device, a faxing device, an imaging device, a scanning device, a multifunction device, a copying device and/or a projecting device. Receiving a selected value may include receiving a value selected by the user. The one or more options may include, for example, double-sided printing/single-sided printing, black ink/color ink, and/or staple/no staple.

In an alternate embodiment, a method of assigning a job in a document processing environment may include receiving, by a first resource, an identifier and a job. The first resource may be in communication with at least a second resource in a document processing environment. The identifier may correspond to a profile of historical usage of a user. The job may have a job type. A customized interface may be displayed on the first resource. The customized interface may present one or more options based on the job type and the profile. A selected value for each of the one or more options may be received. The profile with the one or more selected values may be updated. If the first resource is capable of performing the job using the one or more selected values, the job may be performed using the one or more selected values. In an alternate embodiment, if the first resource is not capable of performing the job using the one or more selected values, the job and the one or more selected values may be transmitted to the second resource.

In one embodiment, the resource performing the job may be capable of performing the job using the one or more selected values. A periodic pulse may be generated by the first resource to determine if a third resource is located in the document processing environment. A third resource may be added to the document processing environment by registering the third resource in a directory. The resource may include a printing device, a faxing device, an imaging device, a scanning device, a multifunction device, a copying device and/or a projecting device. The job and the one or more selected values may be transmitted based on information from a directory.

In an alternate embodiment, a system may include a first resource and a display. A first resource may be configured to receive an identifier and a job. The identifier may correspond to a profile corresponding to a user. The job may have a job type. A first resource may receive a selection for one or more values and may update the profile with the one or more selected values. A display on the first resource may be configured to display a customized interface. The customized interface may present one or more options based on the job type and values selected based on the profile. The profile may be based on historical usage of the user.

In one embodiment, a second resource, in communication with the first resource, may be configured to perform the job using the one or more selected values. In one embodiment, the first resource may be further configured to perform the job using the one or more selected values.

BRIEF DESCRIPTION OF THE DRAWINGS

FIG. 4 depict an exemplary chart according to an embodiment.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

A resource is a device configured to perform one or more jobs. In a document processing environment such as a print shop, a resource is a device that processes a document, and it may include, but is not limited to, a printing device, an imaging device, a copying device, a kiosk, a scanning device, and/or a faxing device.

A socially aware computing environment is a plurality of interconnected resources that share information regarding one or more functions that each resource is configured to perform. In one embodiment, each resource may provide information to a central repository and each resource may access information about the other resources using the central repository. In one embodiment, each resource may provide information to its neighboring resources and each resource may access information from its neighboring resources. In one embodiment, each resource may provide information to a plurality of resources and each resource may access information from the plurality of resources. In one embodiment, each resource may provide information to all the other resources and each resource may access information from any of the other resources.

The term "job" as used herein refers to the instructions and parameters pursuant to which an item is processed using one or more resources. In a document processing environment, a "job" refers to one or more documents to be scanned or processed and one or more instructions used to process the documents. Exemplary instructions may include, but are not limited to, instruments for scanning, printing, faxing, binding, and/or stapling one or more documents.

Figure 1:
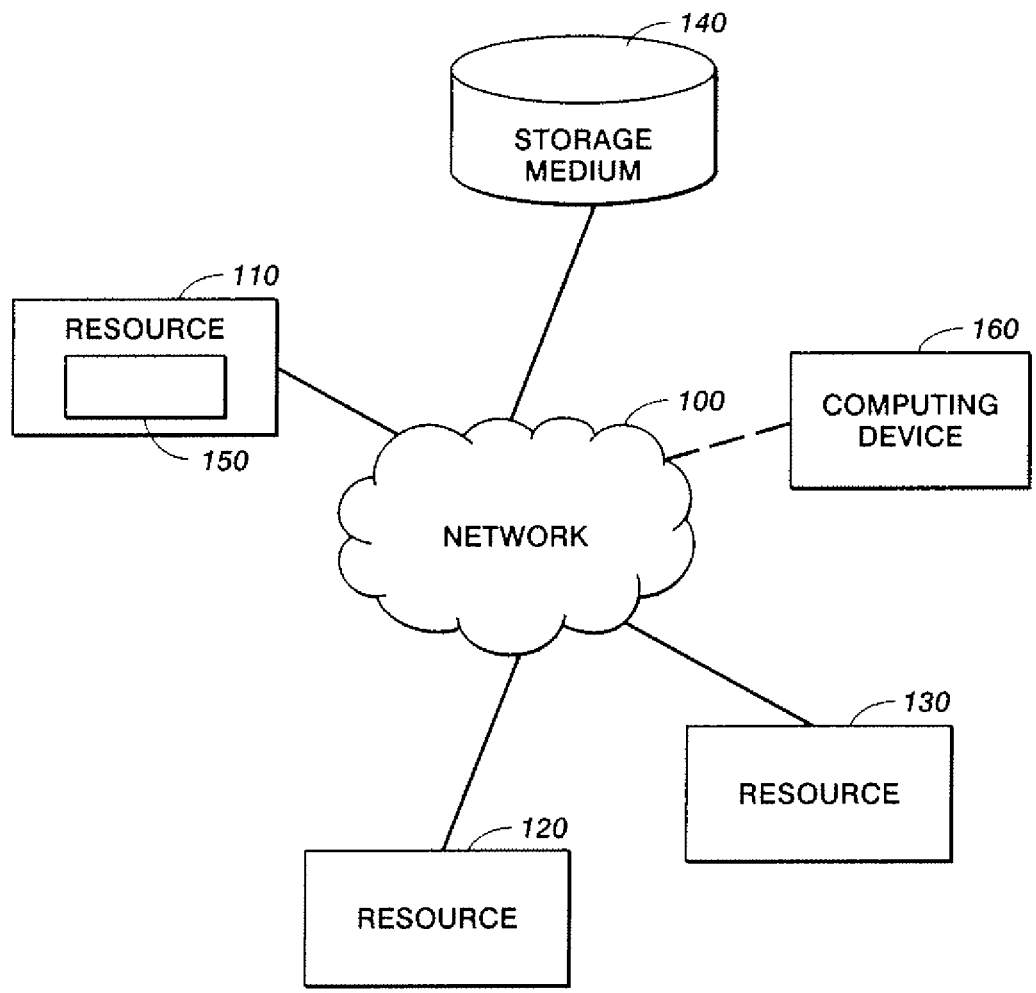
FIG. 1 illustrates exemplary elements in a socially aware computing environment according to an embodiment.

FIG. 1 illustrates exemplary elements in a socially aware computing environment according to an embodiment. As shown in FIG. 1, the system includes a plurality of resources 110, 120, 130. The plurality of resources 110, 120, 130 in the document processing environment may communicate with one another via a network 100, such as a local area network (LAN), wide area network (WAN), Internet, a universal serial bus (USB) network, a Bluetooth network, another wireless or wired network and/or another communications network.

Each resource may access a storage medium 140. The storage medium 140 may be any repository of searchable data, such as a computer-readable memory, database, table or other medium. The data may include a unique identifier associated with a profile. A profile is a collection of a particular user's previously selected jobs, job types, options, and/or values. The profile may include, but is not limited to, one or more jobs, job types, options and/or values. The storage medium 140 may communicate with one or more resources 110, 120, 130 through the network 100. Alternatively, the storage medium may be contained within any of the resources 110, 120, 130.

Each resource may contain a display with a customizable interface 150. A display is an electronic device that represents information in visual form. A display may include, but is not limited to, a liquid crystal display (LCD), a plasma display, a digital light processing (DLP) display, and/or a light-emitting diode (LED) display.

In one embodiment, some or all of the resources are interchangeable. For example, a new resource may be powered on. After a resource establishes its identity on a network, the resource may query the network for any existing neighborhoods or document processing environments. Upon receipt of a joining request, a response may be given confirming the establishment of a document processing environment. The new resource may then receive a copy of the directory for the document processing environment. Every resource in the document processing environment may be listed in the directory. The new resource may be considered to be a part of the document processing environment once the new resource is registered in the directory and receives a copy of the directory.

In one embodiment, in order for the directory to remain current, the document processing device may establish a periodic pulse generated by the first resource in the directory. The pulse may be generated by a first resource and sent to a second resource. If no response is received from the second resource, the first resource may resend a pulse until a response is received or until the pulse has been resent a predetermined maximum number of times. If no response is received, the entry in the directory containing the second resource is deleted and the directory is updated on each resource remaining in the system.

Figure 2:
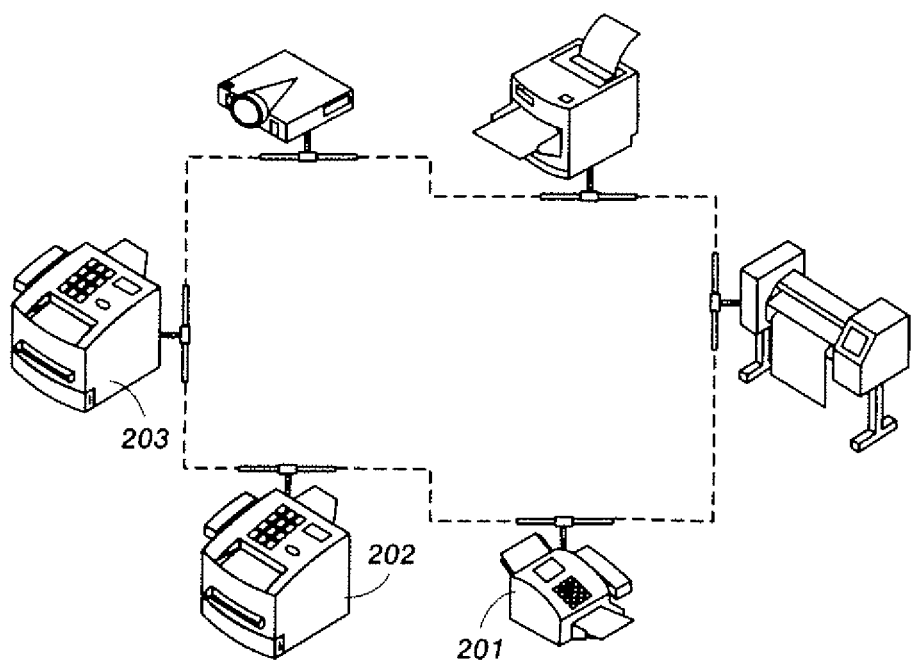
FIG. 2 discloses an exemplary processing environment with a variety of resources according to an embodiment.

FIG. 2 discloses an exemplary document processing environment with a variety of resources in an embodiment. Each resource has the ability to perform one or more specific functions. Additionally, each resource may communicate with every other resource in the document processing environment as described above. A user may browse all the services available in the document processing environment from any device's user interface. In one embodiment, a user may request a job at any resource in the document processing environment, and the job may be performed by a different resource. For example, a user may be physically present in front of a resource 201 that is merely able to fax documents and receive faxes. However, the user may want to print a double-sided color document. As the user initiates the job at a first resource 201, the first resource 201 may display information to inform the user that a second resource 202 supports printing. In one embodiment, there may be more than one resource 202, 203 which can complete the print job. In one embodiment, the user may select a resource to process the job from a plurality of resources. In an alternate embodiment, the first resource 201 may select a second resource to perform the job. Regardless of which device completes the job, the user may initiate the job at the fax (first resource 201) and retrieve the job at the printer (second resource 202 or 203).

Figure 3:
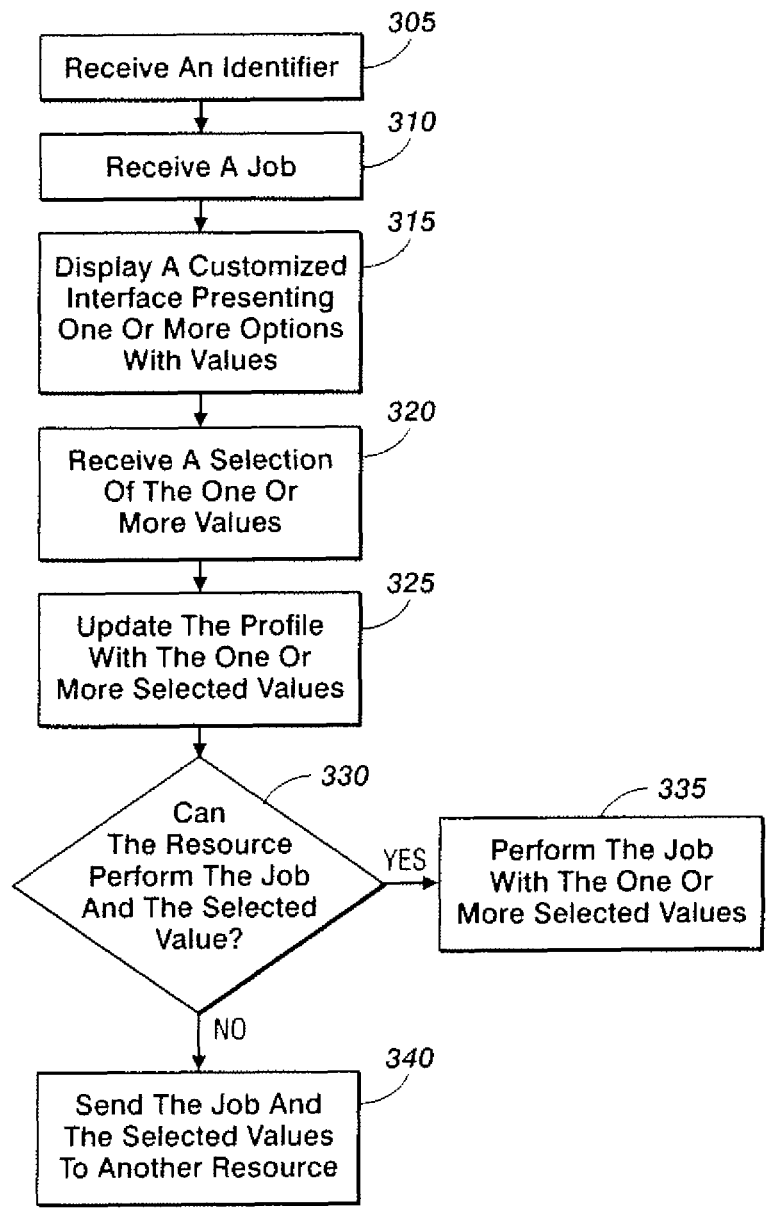
FIG. 3 illustrates a flowchart depicting an exemplary method of displaying information on an interface of a resource in one embodiment.

In one embodiment, a job may be initiated on a resource located on the display. The information in the display may be customized for each user identifier. FIG. 3 illustrates a flowchart depicting an exemplary method of displaying information on an interface of a resource in one embodiment. According to FIG. 3, a first resource may receive an identifier 305. The first resource may be in communication with a plurality of other resources via a network. Each user has a unique associated identifier. In one embodiment, a user may be one or more people. An identifier may be, but is not limited to, a PIN or a code, such as a number, a letter, a symbol, or any combination thereof.

In addition to the identifier, a job may be received by the first resource 310. In one embodiment, a job may include a job type. A job type may refer to an application associated with the job. A job type may be, but is not limited to, a word processing document, a spreadsheet, a portable document format (PDF) product, a flowchart application, a presentation application, and other document processing programs. For example, if a user wants to scan a document generated by a word processing application at a resource, the job may be a scanning operation, and the job type may correspond to a word processing application.

After receiving an identifier and a job type, the information may be displayed on the interface of the first resource 315. The interface may present one or more options based on the job and job type. Options are parameters related to the job and/or job type. Options may include, but are not limited to, color/black ink, double-sided/singled-sided, staple/no staple, and/or phone numbers. For example, if a user desires to print a ten-page document, the job is printing, and the job type may correspond to a PDF file. The options for such a job and job type may include, but are not limited to, single-sided or double-sided printing, color or black ink, quality of print (i.e. high, middle, or draft), and stapling or no stapling.

After the options are offered to the user, the user may chose a value based on the option. A value is assigned by selecting from a plurality of choices presented for the option or by entering a number of other text for the option. For example, if the option is black ink or color ink, the user may choose black ink as the value. In another embodiment, the option may be the number of times the document is replicated. The value may be an entered number. A value includes a selection for an option as well as any other representation of the selection for the option. For example, a value may include double-sided printing as well as an alphanumeric representation denoting the double-sided printing.

A profile may be determined based on the values. The profile includes jobs, job types, options, and/or values selected from all the resources in the document processing environment.

A profile may be associated with a particular identifier. In one embodiment, the profile may include a hierarchical decision tree associating jobs, job types, options and/or values previously chosen by one or more users of an associated identifier. Alternatively, the information in the profile may be stored as, for example, a list, a chart or any other similar format. Additional and/or alternate methodologies for storing related data may be used within the scope of this disclosure as will be apparent to one of ordinary skill in the art.

Figure 5:
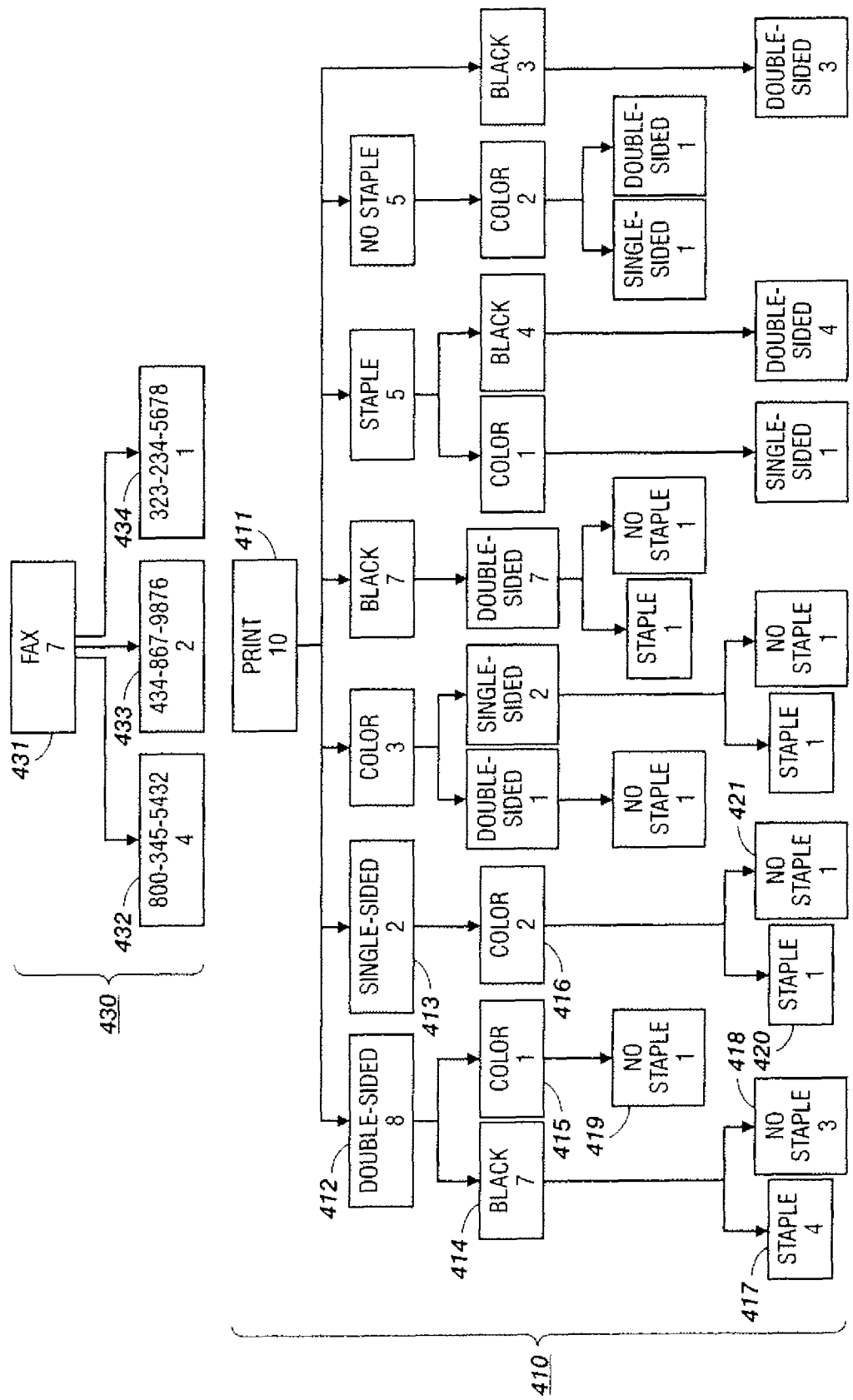
FIG. 5 depicts an exemplary profile according to an embodiment.

FIG. 4 depicts an exemplary chart of the values selected by a user associated with an identifier according to one embodiment. FIG. 5 depicts an exemplary profile according to an embodiment. The chart in FIG. 4 is complied to create the profile in FIG. 5. According to FIG. 5, a user may be associated, through the user's identifier, with a profile which includes two jobs: printing 410 and faxing 430. The user may have requested print jobs ten times 411. Of those ten print jobs, the user may have requested double-sided printing eight times 412 and single-sided printing twice 413. Furthermore, of the eight double-sided printing requests, the user may have requested the use of black ink seven times 414 and color ink once 415. Lastly, of the seven times the user requested the use of black ink for double-sided printing, the document may have requested stapling four times 417 and requested no stapling three times 418. Additionally, of the eight double-sided prints, the one in color 416 may not have been stapled 419. Of the two documents printed on a single side 413, the user may have requested color both times 416 (once with stapling 420 and once without 421).

The user may also have requested faxing seven times 431. The hierarchical decision tree may record the various phone numbers as values associated with the job of faxing 432, 433, 434. For example, the user may have requested that a fax be sent to the number 800-234-5432 four times 432.

If a user sends a job, along with the user's identifier, to a resource, the resource may obtain a profile associated with the user's identifier. The profile, shown in FIG. 5, may be used to determine the information displayed on the interface of the resource. In one embodiment, the most popular values of the options may be displayed on the interface. Referring to FIG. 5, if the most popular values are displayed, the resource may display printing, double-sided, in grayscale with a staple.

The information displayed on the interface may include job information, job type information, options and/or values from the profile of the user. In one embodiment, the values from the options or combination of options that are chosen most frequently for a particular job type may be displayed.

Figure 6A:
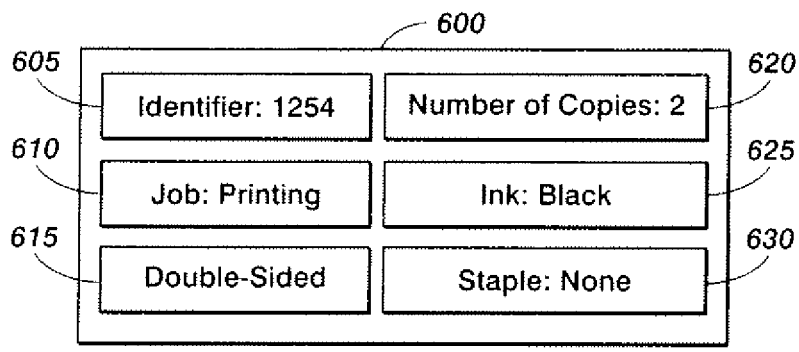
FIGS. 6A-C depict customized interfaces according to embodiments.
Figure 6B:
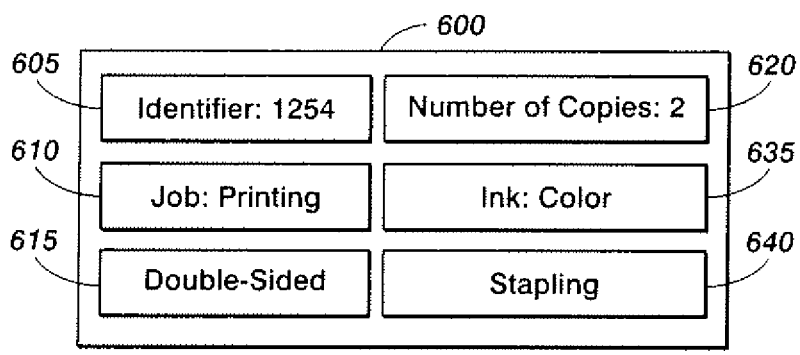
Figure 6C:
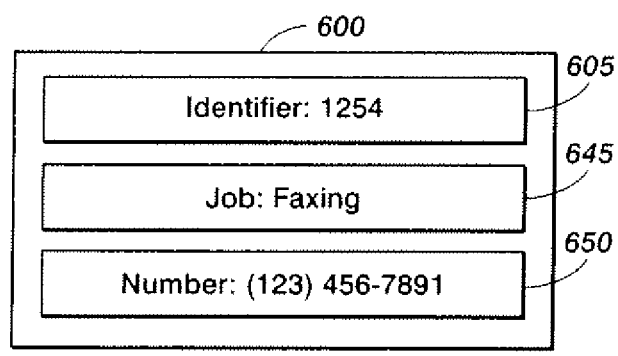

FIGS. 6A-C depict customized interfaces on a resource in embodiments. In FIG. 6A, the interface 600 may be customized based on the information in the user's profile. The identifier 605 may be displayed on the interface along with the most frequently selected job and associated options. In FIG. 6A, the job of printing is most often selected by the user and therefore the job of printing 610 may be displayed. Associated with the job of printing, the options of printing double-sided 615, two copies 620, black ink 625, and not stapled 630 may be displayed on the customized interface 600. The user may select any of these displayed options or may choose a different job or options.

FIG. 6B depicts a customized interface on a resource where the user chose a different option associated with the print job of FIG. 6A. In FIG. 6B, the user decided to print, but the user chose to print in color. As shown in FIG. 6B, the identifier 605 with the job of printing 610 and with the options of double-sided 615 and printing two copies 620 were selected by the user and may be displayed. However, if the user changes from black ink to color ink 635, the staple value may change based on the information stored in the profile. As a result of the user selecting color ink 635, the value of stapling 640 may now be displayed on the interface 600.

FIG. 6C depicts a customized interface where the user chose to fax instead of print. As a result of the user selecting a different job, the entire interface may be re-customized for the user. The customized interface of FIG. 6C depicts the job of faxing 645 as well as the most frequently dialed fax number 650.

Referring back to FIG. 3, after the customized interface is displayed, a selection of the one or more values may be received 320. In one embodiment, the user may agree with the one or more values displayed on the customized interface. In an alternate embodiment, the user may disagree with one or more values selected on the customized interface. If the user does not agree with one or more values listed on the customized interface, the user may change one or more of the values. In one embodiment, an input device may allow the user to reselect or change the values. The user's selected values may be received via a mouse, a touch screen, a button or other input device associated with the display on the first resource.

For example, for printing, the values displayed based on the profile may be a single-sided color ten-page document with no staples. A user may agree with the value to print single-sided and in color, but may decide to have the printed pages stapled. Therefore, the user may agree with the first two values and change the third value on the customized interface.

In one embodiment, when the user changes a value, the system will reconfigure and adjust the customized interface to display the most frequently chosen value associated with the previously selected value. For example, using the profile in FIG. 5, the user may agree with the value to print double-sided. However, the user many then chose color ink instead of black ink. Therefore, the customized interface would adjust to show the value of no staple since that is the value most often chosen with the option of stapling when the previous values of double-sided and color pages are selected with printing.

In an alternate embodiment, the user may choose to fax, rather than print, a document. Therefore, the most popular fax number may be displayed as a value in the customized interface.

Once the values are chosen, the profile may be updated with the selected values 325. The values selected by the user may be added to the code which corresponds to the user's profile. Adding the new values selected by the user may allow the corresponding profile to be updated. If the user does not have a corresponding profile, a profile may be created which may store the values selected by the user.

After the profile is updated, the first resource may determine if it can perform the job and the selected values 330. The first resource can perform the job if it has the functionality associated with both the job and the selected values.

If the first resource can perform the job using the one or more selected values, the first resource may perform the job 335. However, if the first resource cannot perform the job using the one or more selected values, a second resource may be identified that can perform the job. The job and the one or more selected values may be sent to the second resource 340.

In one embodiment, the job and the one or more selected values may be sent to a second resource based on the directory. As discussed above, the directory may be provided to every resource in the document processing environment. In one embodiment, the directory may include the functionality of each resource. Accordingly, a first resource, which received the job and the one or more values, may transfer the job and the one or more selected values to a capable second resource. In an alternate embodiment, the job and the one or more selected values may be transmitted using the resources in the document processing environment until a resource is found which is capable of performing the job using the one or more selected values. Additional and/or alternate methodologies for finding a resource with the necessary functionality may be used within the scope of this disclosure as will be apparent to one of ordinary skill in the art.

In another exemplary embodiment, a user located at a computing device may select a type of job to be performed without specifying a resource to perform a job. Referring back to FIG. 1, optionally, the network 100 may include a computing device 160. The computing device 160 may be in communication with the resources 110, 120, 130 through the network 100.

Referring to FIG. 3, the computing device may receive an identifier 305. In one embodiment, a customized interface may be displayed on the computing device and may allow the user to enter an identifier and a job 310. Upon receiving the identifier and the job, the customized interface may present the user with one or more options and values 315 related to the job and job type. The values may be customized using a profile associated with the identifier entered by the user. The user may select one or more of the values 320, and the profile may be updated to reflect the selected values 325. The computing device may transmit the job and the one or more selected values to a resource 340. The computing device may choose a resource that is capable of performing the job using the one or more selected values. In one embodiment, the computing device may access a directory (such as the one described above) to obtain information regarding the capabilities of the resources in the document processing environment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of assigning a job in a document processing environment, the method comprising:

receiving, by a first device, an identifier and a job, wherein the first device is in communication with a plurality of second devices in a document processing environment, wherein the first device does not have functionality to perform the job, wherein the identifier uniquely associates a profile with a user, wherein the job has a job type, and wherein the first device and at least some of the plurality of second devices comprise at least one of the following:

a printer, a faxing device, an imaging device, a scanning device, a multifunction device, a copying device, and a projecting device;

displaying a customized interface on the first device, wherein the customized interface presents one or more options based on the job type and the profile, wherein the profile is based on historical usage of the user, wherein each option is associated with a plurality of values, wherein one of the values for each option has an assigned value, and wherein displaying the customized interface comprises:

accessing, by the first device, the profile corresponding to the identifier, determining, by the first device, a most frequently selected job, a most frequently selected associated job type, and at least one most frequently selected option associated with the most frequently selected job type from among a plurality of previously selected jobs, a plurality of previously selected job types, and a plurality of previously selected options related to the historical usage of the user, and displaying, by the first device, the most frequently selected job, the most frequently selected associated job type, and the at least one most frequently selected option associated with the most frequently selected job type;

receiving a selected value from the plurality of values, wherein when at least one selected value is received, the assigned value for at least one option changes based on the selected value and the profile;

updating the profile with the one or more selected values;
displaying, at the first device, a list of one or more of the second devices that each has functionality to perform the job;
receiving a selection of a second device from the list of second devices; and
transmitting, by the first device, the job and the one or more selected values to the selected second device.

2. The method of claim 1 wherein transmitting the job and the one or more selected values to at least one of the plurality of second devices comprises transmitting, by the first device, the job and the one or more selected values to at least one of the plurality of second devices based on information from a directory.

3. The method of claim 1 further comprising:
generating a periodic pulse by the first device to determine if at least one of the plurality of second devices is located in the document processing environment.

4. The method of claim 1 further comprising:
adding an additional second device to the document processing environment by registering the additional second device in a directory, wherein the additional second device comprises at least one of the following:
a printer, a faxing device, an imaging device, a scanning device, a multifunction device, a copying device, and a projecting device.

5. The method of claim 1 wherein receiving a selected value comprises:
receiving a value selected by the user.

6. The method of claim 1 wherein the one or more options comprise at least one of the following:
double-sided printing/single-sided printing, black ink/color ink, and staple/no staple.

7. The method of claim 1, wherein the first device comprises a faxing device, wherein the selected second device comprises a printer.

8. A method of assigning a job in a document processing environment, the method comprising:
receiving, by a first device, an identifier and a job, wherein the first device is in communication with at least a second device in a document processing environment, wherein the first device does not have functionality to perform the job, wherein the identifier uniquely associates a profile of historical usage with a user, wherein the job has a job type, and wherein the first printing device and the at least second printing device comprise at least one of the following:
a printer, a faxing device, an imaging device, a scanning device, a multifunction device, a copying device, and a projecting device;
displaying a customized interface on the first device, wherein the customized interface presents one or more options based on the job type and the profile, wherein displaying the customized interface comprises:
accessing, by the first device, the profile corresponding to the identifier,
determining, by the first device, a most frequently selected job, a most frequently selected associated job type, and at least one most frequently selected option associated with the most frequently selected job type from among a plurality of previously selected jobs, a plurality of previously selected job types, and a plurality of previously selected options related to the historical usage of the user, and
displaying, by the first device, the most frequently selected job, the most frequently selected associated job type, and the at least one most frequently selected option associated with the most frequently selected job type;
receiving a selected value for each of the one or more options;
updating the profile with the one or more selected values;
selecting, by the first device, a second device from the plurality of second devices that has functionality to perform the job; and
transmitting, by the first device, the job and the one or more selected values to the selected second device.

9. The method of claim 8 further comprising:
adding a third device to the document processing environment by registering the third device in a directory, wherein the third device comprises at least one of the following:
a printer, a faxing device, an imaging device, a scanning device, a multifunction device, a copying device, and a projecting device.

10. The method of claim 9 further comprising:
generating a periodic pulse by the first device to determine if the at least one of the plurality of second devices is located in the document processing environment.

11. The method of claim 8 wherein transmitting, by the first device, the job and the one or more selected values is based on information from a directory.

12. The method of claim 8, wherein the first device comprises a faxing device, wherein the selected second device comprises a printer.

13. A system comprising:
a first device; and
a plurality of second devices in communication with the first device,
wherein the first device is configured to:
receive an identifier and a job, wherein the first device does not have functionality to perform the job, wherein the identifier corresponds to a profile associated with a user, wherein the job has a job type,
display a customized interface on the first device, wherein the customized interface presents:
one or more options based on the job type and the profile, wherein the profile is based on historical usage of the user, wherein each option is associated with a plurality of values, and wherein one of the values for each option has an assigned value,
a most frequently selected job,
a most frequently selected associated job type, and
at least one most frequently selected option associated with the most frequently selected job type from among a plurality of previously selected jobs, a plurality of previously selected job types, and a plurality of previously selected options related to the historical usage of the user,
receive a selected value from the plurality of values, wherein when at least one selected value is received, the assigned value for at least one option changes based on the selected value and the profile,
update the profile with the one or more selected values,
display a list of one or more of the second devices that each has functionality to perform the job,
receive a selection of a second device from the list of second devices, and
transmit the job and the one or more selected values to the selected second device,
wherein the first device comprises at least one of the following:

a printer, a faxing device, an imaging device, a scanning device, a multifunction device, a copying device, and a projecting device.

* * * * *